United States Patent [19]

Carr

[11] Patent Number: 5,622,536
[45] Date of Patent: Apr. 22, 1997

[54] SCRUBBER FOR WASTE GASES

[76] Inventor: William J. Carr, 1298 Ballard Ct., San Jose, Calif. 95132

[21] Appl. No.: 368,702

[22] Filed: Jan. 4, 1995

[51] Int. Cl.⁶ .................................................. B01D 47/02
[52] U.S. Cl. ............................................................ 55/230
[58] Field of Search ............................ 55/230, 234, 235, 55/247, 259

[56] References Cited

U.S. PATENT DOCUMENTS

| | | | |
|---|---|---|---|
| 3,918,941 | 11/1975 | Fallon, III | 55/230 |
| 3,969,093 | 7/1976 | Murray, Jr. | 55/229 |
| 4,594,081 | 6/1986 | Kroll et al. | 55/222 |
| 4,762,539 | 8/1988 | Muto | 55/232 |
| 5,017,203 | 5/1991 | Cox et al. | 55/457 |
| 5,185,016 | 2/1993 | Carr | 55/230 |
| 5,186,016 | 2/1993 | Carr | 55/230 |

OTHER PUBLICATIONS

Perry's Chemical Engineers' Handbook, 5th edition, pp. 18–85 to 18–89, 1973.

Primary Examiner—David W. Wu
Attorney, Agent, or Firm—William H. Eilberg

[57] ABSTRACT

A waste gas scrubber includes a hollow, cylindrical atomizer, mounted for rotation about its longitudinal axis. The atomizer is partially submerged in a pool of liquid. The atomizer has relatively large openings at its two ends, and has a plurality of closely-spaced vanes along its middle section. Waste gas is drawn into the openings at one end of the atomizer, and is combined with liquid scooped in by the vanes when the atomizer rotates. The liquid tends to absorb and/or encapsulate particulates in the gas stream. The resulting fluid is then drawn out of the atomizer through the openings at its other end. A blower provides negative pressure which draws the fluids through the desired path, and which overcomes the centrifugal force produced by rotation of the atomizer. Substantially the entire interior region of the atomizer is used for scrubbing, so that the scrubber is much more efficient than waste gas scrubbers of the prior art.

17 Claims, 3 Drawing Sheets 5,622,536

SCRUBBER FOR WASTE GASES

BACKGROUND OF THE INVENTION

This invention relates to the field of treatment of toxic gases, and provides a method and apparatus for rendering toxic gases harmless before they are discharged into the atmosphere.

The present invention comprises an improvement over the scrubber described in U.S. Pat. No. 5,185,016, the specification of which is incorporated by reference herein.

Many industrial plants produce toxic gases which may not be legally discharged into the atmosphere without treatment. One example of such a toxic gas is HCl gas, which is a by-product of electronics fabrication processes. The present invention can be used to scrub HCl gas, as well as a wide variety of other toxic gases.

The scrubber in the above-cited patent includes a generally cylindrical rotatable member, surrounded by a non-moving stator disposed around the periphery of the rotatable member. The waste gas and the scrubbing liquid meet in the annular region between the rotatable member and the stator, and the scrubbing occurs in that region.

While the scrubber in the above-cited patent does perform its intended function, it also has certain disadvantages. Because the scrubbing in the patented device occurs only in a relatively small annular region, the device must occupy a large volume relative to the volume within which scrubbing actually occurs. Thus, the major portion of the volume of the patent device is wasted, since the interior region of the cylindrical rotatable member is not used for scrubbing. Thus, the throughput of the device is limited by the amount of gas and liquid that can be accommodated in a relatively small annular region. The efficiency of the scrubbing process is therefore limited, and one must expend relatively large amounts of energy to achieve the desired result. Also, with the device of the prior art, for a given flow rate of waste gas, one needs a relatively bulky and heavy machine, and one which consumes large amounts of energy.

The present invention overcomes the above-described disadvantages, by providing a scrubber having a much greater efficiency than the device of the prior art. The scrubber of the present invention consumes comparatively little energy, in relation to the flow rate of waste gas being treated. The present invention provides a method and apparatus in which the waste gas stream is efficiently mixed with a scrubbing medium, such as water, so that the toxic material in the gas stream is readily absorbed or encapsulated by the scrubbing medium.

SUMMARY OF THE INVENTION

The scrubber of the present invention includes an atomizer which sits partially submerged in a pool of liquid. The atomizer is a hollow, generally cylindrical member, mounted for rotation about its longitudinal axis. The atomizer has three sections, including two relatively short end sections and a longer middle section. The middle section has a plurality of vanes, spaced relatively closely together. The end sections define openings having a length and width considerably larger than the spacing between the vanes. The sections are demarcated by baffles within which the atomizer is journalled for rotation. The baffles help to define a path for flow of fluid in the region exterior to the atomizer. The baffles do not extend to the interior region of the atomizer; instead, all three sections of the atomizer comprise one large interior region.

Waste gas enters the atomizer at one end section, and passes into the interior region of the atomizer through the openings. Meanwhile, some of the liquid from the pool, which comprises the scrubbing medium, is scooped up by the vanes and enters the interior region of the atomizer. Negative pressure produced by a blower draws the gas and liquid through the interior of the atomizer. The rotation of the atomizer causes the liquid to form droplets, and the droplets absorb and/or encapsulate particulates in the gas stream. The gas-liquid mixture leaves the atomizer at the opposite end, through the openings at that end. The negative pressure produced by the blower is sufficient to overcome the tendency of the gas and liquid to move towards the periphery of the atomizer due to centrifugal force generated by the rotation. The gas leaving the atomizer is substantially separated from the undesirable particulates. Removal of the remaining moisture leaves a gas that is basically clean.

There is an optimal level to which the atomizer should be submerged in the pool of scrubbing liquid. If the atomizer is submerged too deeply, an excessive amount of torque (and therefore horsepower) is required to rotate the atomizer. If the atomizer is not submerged deeply enough, the scrubbing effect is reduced. In practice, the optimal level is such that the liquid covers about 3–9%, and preferably about 6%, of the diameter of the atomizer.

In the present invention, most or all of the interior region of the atomizer is used for mixing gas and liquid, and thus the present invention is very efficient, as it increases the throughput of gas, as compared with scrubbers of the prior art.

The present invention therefore has the primary object of providing a scrubber for waste gases.

The invention has the further object of increasing the efficiency of a scrubber for waste gases.

The invention has the further object of increasing the volume of gas that can be scrubbed in a given time.

The invention has the further object of providing a scrubber which consumes a relatively small amount of water.

The invention has the further object of providing a scrubber which consumes relatively little power.

The invention has the further object of reducing the relative size of a scrubber for waste gases.

The invention has the further object of providing a scrubber that is self-cleaning.

The invention has the further object of providing a method of scrubbing, which method is more efficient than the methods of the prior art.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
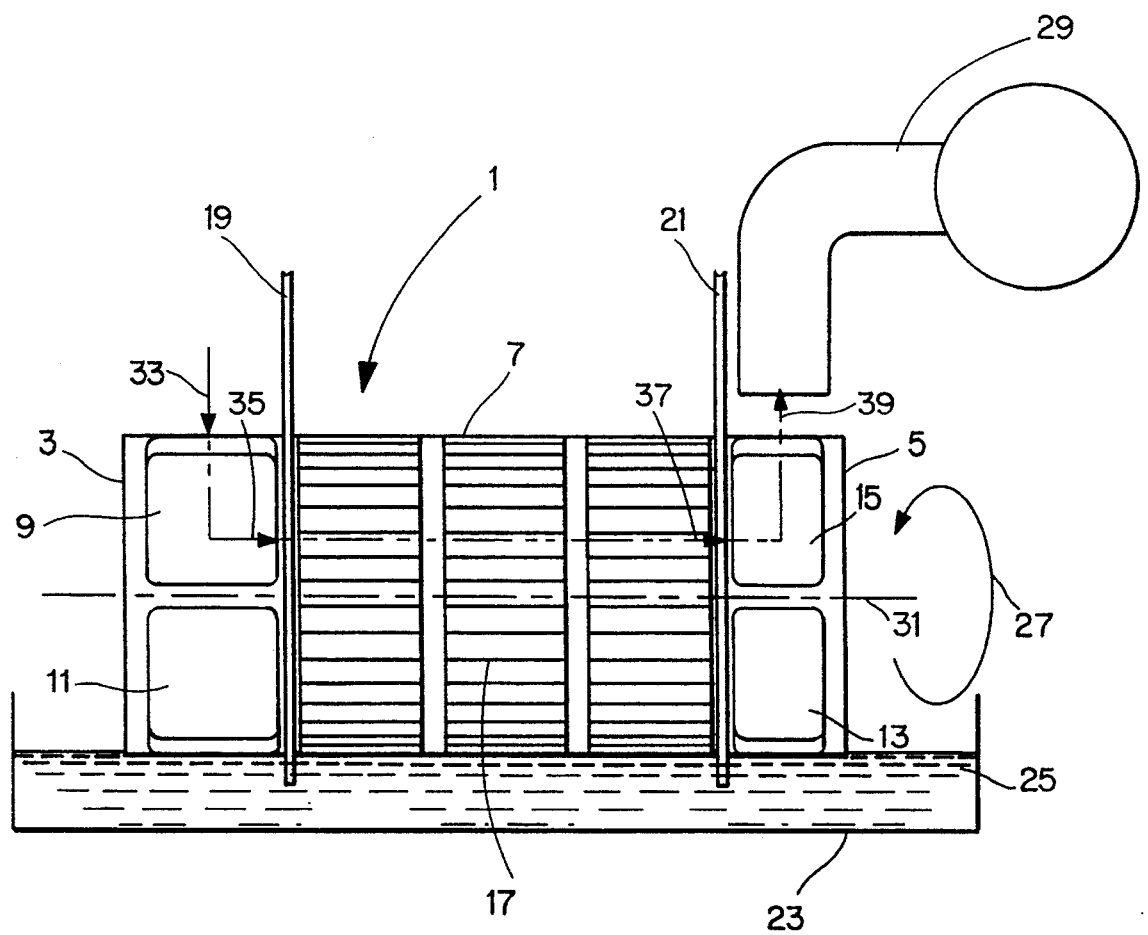
FIG. 1 provides a partially schematic, elevational view of the most essential features of the scrubber of the present invention, showing the atomizer submerged in the liquid pool, and showing the general path for flow of gas.

FIG. 1 illustrates the basic structure and operation of the scrubber of the present invention. The scrubber includes atomizer 1 which comprises a hollow, cylindrical member. Atomizer 1 has three sections, namely end sections 3 and 5, and middle section 7. The end sections are formed with relatively large openings, extending around the periphery of the atomizer. In the elevational view of FIG. 1, only two openings are visible at each end section. Openings 9 and 11 are formed at end section 3, and openings 13 and 15 are formed at end section 5. Middle section 7 has a plurality of vanes 17, the vanes also extending around the entire periphery of the atomizer. The vanes are spaced from each other such that the average spacing between adjacent vanes is less than (and preferably much less than) the width or length of any of the openings.

The exterior region of the atomizer is divided into three areas, coinciding with the three sections described above, by baffles 19 and 21. The baffles extend radially outward from the atomizer, and define bearings within which the atomizer is journalled for rotation. The baffles separate fluid flows in the exterior region of the atomizer. The baffles do not extend to the interior region of the atomizer; instead, the three sections form one large open volume within the interior of the atomizer.

The atomizer is mounted by suitable means (not shown) to rotate about its longitudinal axis 31, as indicated by arrow 27. The atomizer sits within a pool 25 of liquid held within container 23. The liquid, which can be water, serves as a scrubbing medium for the waste gases. Blower 29 provides negative pressure which draws fluid through the system, as will be described below.

Waste gas to be scrubbed enters the system shown in FIG. 1 at the left-hand side, as indicated by arrow 33. The atomizer is always rotating while the scrubber is operating. The waste gas enters the interior region of the atomizer by passing through one of the openings in end section 3. Since the openings are relatively large, a given molecule of gas can easily pass through one of the openings even while the atomizer is rotating rapidly. The negative pressure induced by the blower causes the gas to be drawn to the right, towards the middle section of the atomizer, and within its interior region, as indicated by arrow 35.

Meanwhile, the rotating atomizer causes a quantity of liquid from the pool 25 to pass from the exterior region to the interior region of the atomizer. The liquid is scooped into the interior region by the vanes 17, which act as small paddles that are urged against the liquid. The closely-spaced vanes tend to atomize the liquid so that the liquid reaches the interior of the atomizer in the form of small droplets. Also, the vanes create considerable turbulence in the liquid, and this turbulence is encountered by the gas as it first enters the interior of the atomizer.

Baffles 19 and 21 protrude somewhat into the pool, as shown, but do not extend to the bottom of the container. Thus, the pool spans all three sections of the atomizer.

Gas and liquid become thoroughly mixed in the interior region of the atomizer, and primarily in the portion of the interior region corresponding to the middle section. The gas initially encounters a dense wall of liquid, caused by the atomizer scooping up the liquid and forcing it through the vanes into the interior of the atomizer. As the gas passes through the interior of the atomizer, a mole-to-mole combination of liquid and gas tends to form. Depending on the specific chemistry of the substances being scrubbed, this combination may be either chemical or mechanical.

Substantially the entire interior portion is available for use in mixing the gas and liquid. Such mixing results in encapsulation and/or absorption of particulates by the liquid, and thus renders the gas stream harmless and suitable for discharge into the atmosphere. The negative pressure of blower 29 is made sufficiently great to overcome the tendency of the gas and liquid to leave the rotating atomizer due to centrifugal force.

The gas and liquid then continue traveling to the right, as indicated by arrow 37, and they then leave the atomizer, through the openings in end section 5, as indicated by arrow 39. The fluid stream continues to flow under the influence of blower 29, and continues towards an appropriate discharge outlet. Note that FIG. 1 does not explicitly show all of the walls of the channels (other than baffles 19 and 21) that convey the gas stream prior to entering and after leaving the atomizer; it is assumed that there is provided the necessary ductwork to create a single path for fluid flow, as described above.

The liquid level should not be set too high; otherwise, too much torque (and motor horsepower) is required to rotate the atomizer. On the other hand, if the liquid level is too low, the scrubbing effect will not be sufficient. It has been found that the optimum liquid level is such that the maximum depth of the atomizer is about 6 percent of the diameter of the atomizer. This level can be reduced as low as about 3 percent, and can be raised as high as about 9 percent. Thus, the preferred range is about 3–9%. In defining the "maximum depth" of the atomizer, it is assumed that the cylindrical atomizer lies substantially level with the liquid, with the maximum depth being measured from a point where the atomizer extends most deeply into the pool, to the surface of the pool, along a line perpendicular to the surface of the pool.

Figure 2:
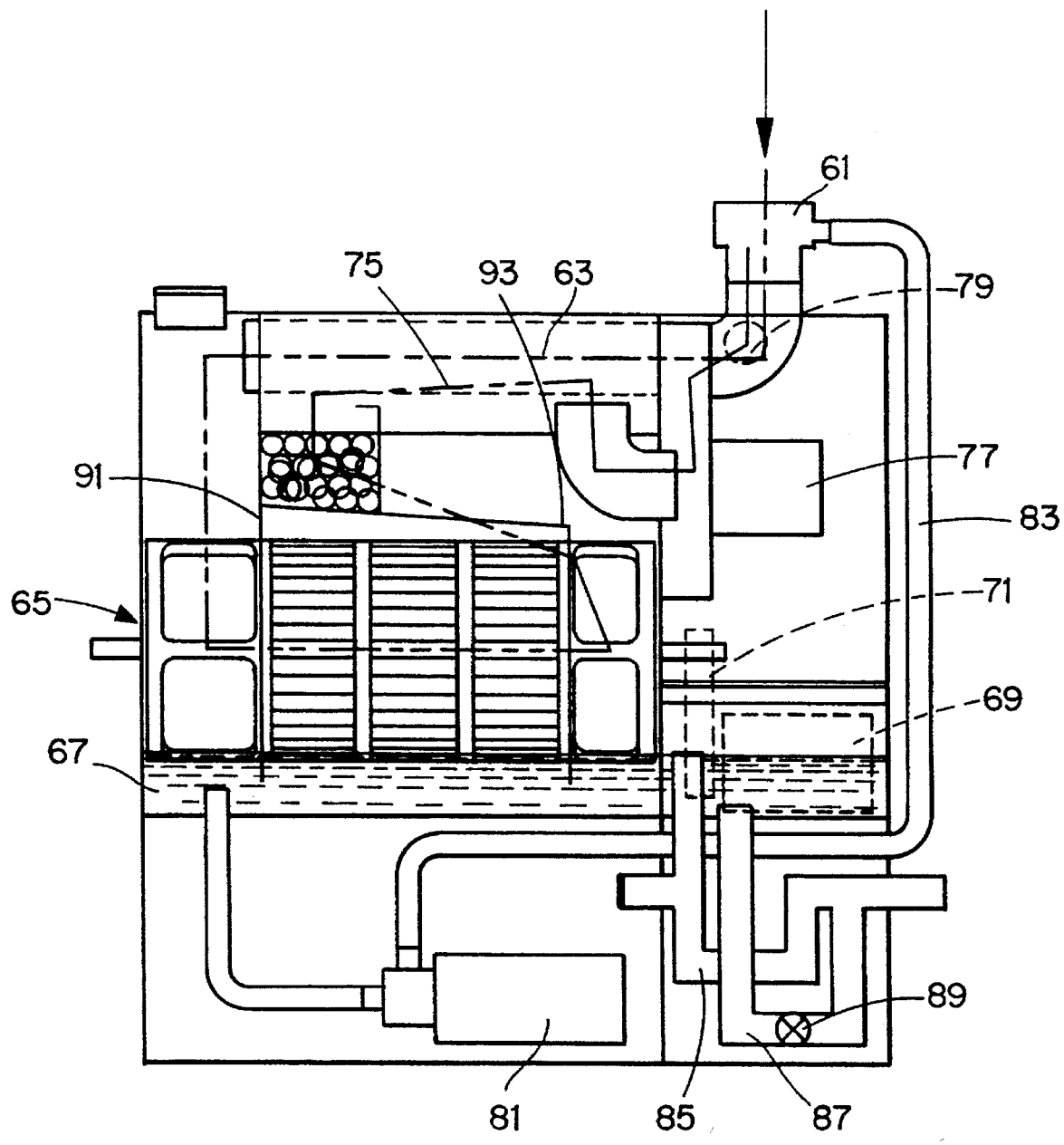
FIG. 2 provides an elevational view of a scrubber made according the preferred embodiment of the present invention.
Figure 3:
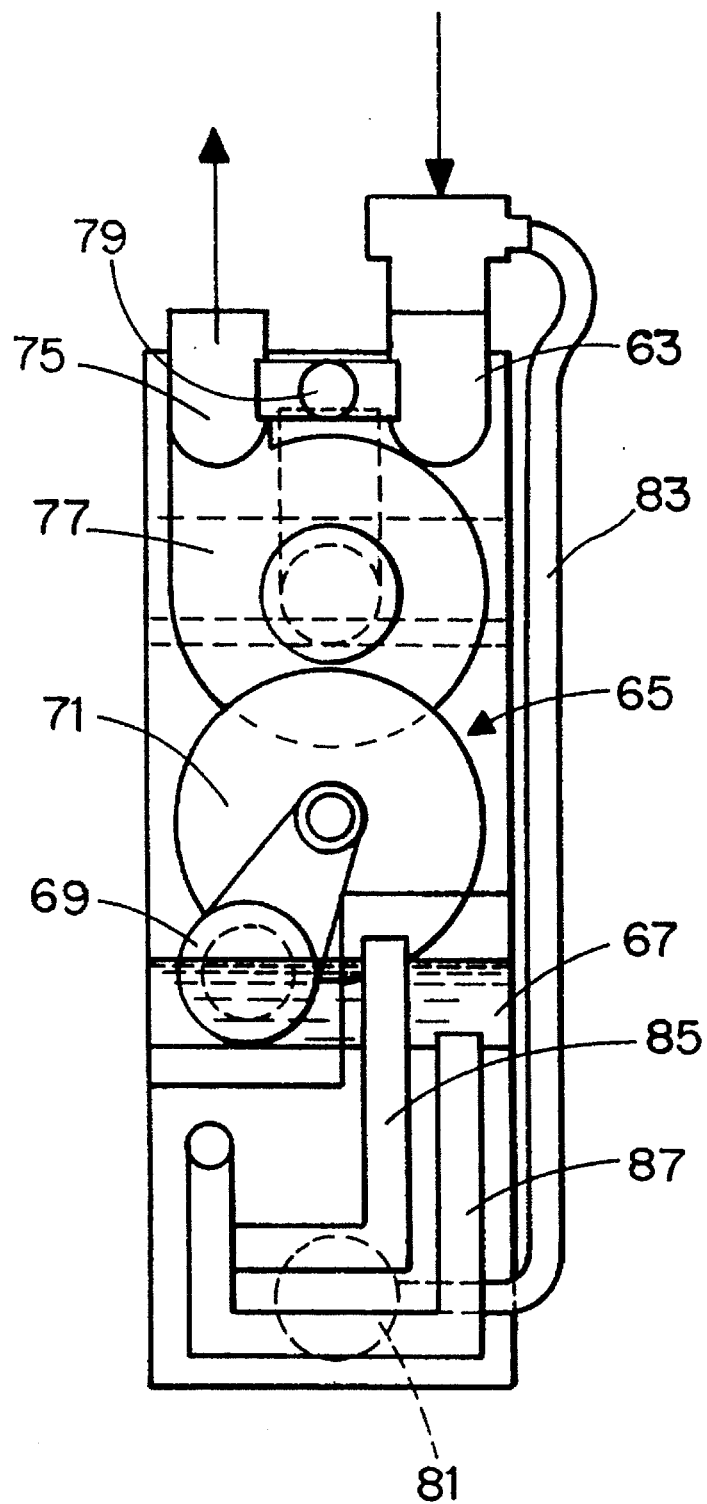
FIG. 3 provides an end view of the scrubber of FIG. 2.

FIGS. 2 and 3 show a scrubber, made according to the preferred embodiment of the present invention. Waste gas to be scrubbed enters the system at inlet 61, and passes through inlet channel 63 to the left end portion of atomizer 65. The atomizer has the same structure as described above with respect to FIG. 1. Baffles 91 and 93 separate the fluid streams in the region exterior to the atomizer. The atomizer is held partially submerged in pool 67, and is rotated by motor 69, acting through drive belt 71.

Gas and liquid leaving the atomizer is channeled first to a demister, which removes liquid from the gas stream. The demister can be a molecular sieve or its equivalent. Liquid collected in the demister can be returned to the pool. The dried gas is then conveyed through outlet channel 75, due to the negative pressure of blower 77.

As illustrated in FIG. 2, the inlet and outlet streams are made to pass through cross valve 79. The cross valve provides fluid communication between the inlet and outlet streams, and therefore recycles a portion of the output scrubbed gas back to the input. The reason for this recycling is to help to cool the input waste gas stream, which may be initially very hot. The scrubbing process is also a cooling process, since the essence of the scrubbing is to mix the waste gas with droplets of a relatively cool liquid.

Another means for cooling the inlet gas stream includes pump 81 which draws liquid from pool 67 and conveys the liquid through conduit 83 to the opening of the inlet channel. The liquid is passed through a nozzle (not shown), or other suitable device, to cool the gas entering the system. Either or both of the above-described cooling means can be included in the present invention. Both cooling means could also be omitted, especially where the waste gas to be scrubbed is not excessively hot.

The cooling means comprising pump 81 and conduit 83 can also affect the degree to which the scrubber absorbs particulates from the waste gas stream, since varying the flow of liquid in conduit 83 varies the level of saturation of the scrubbing medium.

Conduit 85 prevents overfilling of the pool, especially while the pool is being filled or replenished. The conduit 85 defines a generally U-shaped trap which helps to overcome the negative pressure developed by the blower. Excess liquid can be drained through this conduit, either manually or by automatic means, so that the level of liquid is maintained at an optimum level. Liquid is consumed during the scrubbing process, and the pool must be continuously replenished to maintain the optimum level.

Conduit 87 is used for periodically cleaning the system. Valve 89 can be a manually operated valve, and can be used to drain the system prior to cleaning.

It is preferred that the middle section of the atomizer be much longer than the end sections, though the relative lengths of the sections can be varied, within the scope of the invention. Increasing the relative length of the middle section increases the volume which is most readily used for scrubbing.

One can vary the size and number of the openings and the vanes in the atomizer, within the scope of the invention.

The invention has been described with respect to specific embodiments, but still other variations are possible. Such variations should be considered within the spirit and scope of the following claims.

What is claimed is:

1. A waste gas scrubber comprising:
   a) means defining a pool of liquid,
   b) an atomizer comprising a hollow, generally cylindrical member, the atomizer defining a generally cylindrical interior region and an exterior region, the atomizer being mounted for rotation such that a portion of the atomizer is submerged in the pool,
   c) means for directing waste gas to be scrubbed from the exterior region through the interior region and back to the exterior region, wherein the waste gas and liquid are free to occupy substantially the entire interior region, and
   d) means for rotating the atomizer.

2. The scrubber of claim 1, wherein the atomizer comprises first and second end sections and a middle section, the end sections having a plurality of openings formed in the cylindrical member, the middle section having a plurality of vanes, wherein the vanes have an average spacing between adjacent vanes, and wherein the openings have a width and a length, and wherein the width and length of the openings are both greater than the average spacing between adjacent vanes.

3. The scrubber of claim 1, wherein the atomizer has a diameter, and wherein the atomizer is submerged in the pool to a depth such that liquid covers about 3–9% of the diameter of the atomizer.

4. The scrubber of claim 3, wherein the liquid covers about 6% of the diameter of the atomizer.

5. The scrubber of claim 1, wherein the directing means includes blower means for generating negative pressure, wherein gas and liquid are drawn through the atomizer.

6. The scrubber of claim 1, further comprising inlet means, and wherein the directing means comprises means for directing gas from the inlet means into the interior region of the atomizer, the scrubber further comprising means for conveying liquid from the pool to the inlet means.

7. The scrubber of claim 6, wherein gas leaving the atomizer is conveyed to an outlet means, and wherein the scrubber further comprises means for providing fluid connection between the inlet means and the outlet means.

8. The scrubber of claim 1, further comprising demister means, connected within a flow path for gas leaving the atomizer.

9. A scrubber for waste gases, the scrubber comprising a hollow, generally cylindrical member having a longitudinal axis and a generally cylindrical interior region, means for rotating the cylindrical member about its longitudinal axis, the cylindrical member being partially submerged in a pool of liquid, the cylindrical member having two end sections and a middle section, the cylindrical member having openings at both end sections and a plurality of vanes at its middle section, and means for directing a waste gas into the interior region of the cylindrical member, at one of the end sections, and for directing the gas through the interior region and out at the other of said end sections, wherein the waste gas and liquid are free to occupy substantially the entire interior region.

10. The scrubber of claim 9, wherein the directing means comprises a blower which provides negative pressure.

11. The scrubber of claim 9, wherein the vanes are spaced apart from each other by an average spacing which is less than any dimension of the openings.

12. The scrubber of claim 9, wherein the gas enters the cylindrical member through an inlet channel and leaves the cylindrical member through an outlet channel, and wherein scrubber includes means for providing fluid communication between the inlet and outlet channels.

13. The scrubber of claim 9, wherein the gas enters the cylindrical member through an inlet channel and leaves the cylindrical member through an outlet channel, and wherein the scrubber further comprises means for directing liquid from the pool to the inlet channel.

14. The scrubber of claim 9, wherein the gas enters the cylindrical member through an inlet channel and leaves the cylindrical member through an outlet channel, and wherein the outlet channel includes demisting means for removing liquid from gas flowing in the outlet channel.

15. A scrubber for waste gases, the scrubber comprising a hollow, generally cylindrical member having a longitudinal axis and a generally cylindrical interior region, means for rotating the cylindrical member about its longitudinal axis, the cylindrical member having two end sections and a middle section, the cylindrical member having openings at both end sections and a plurality of vanes at its middle section, and means for directing a waste gas into the interior region of the cylindrical member, at one of the end sections, and for directing the gas through the interior region and out at the other of said end sections, wherein the waste gas and liquid are free to occupy substantially the entire interior region.

16. The scrubber of claim 15, wherein the directing means comprises a blower which provides negative pressure.

17. The scrubber of claim 15, wherein the vanes are spaced apart from each other by an average spacing which is less than any dimension of the openings.

* * * * *